(12) United States Patent
Snider et al.

(10) Patent No.: US 8,159,336 B2
(45) Date of Patent: Apr. 17, 2012

(54) APPARATUS AND METHOD FOR MAINTAINING COMMUNICATION WITH A STOLEN VEHICLE TRACKING DEVICE

(75) Inventors: James Snider, Kildeer, IL (US); Robert F. D'Avello, Lake Zurich, IL (US)

(73) Assignee: Continental Automotive Systems US, Inc., Auburn Hills, MI (US)

( * ) Notice: Subject to any disclaimer, the term of this patent is extended or adjusted under 35 U.S.C. 154(b) by 265 days.

(21) Appl. No.: 12/643,841

(22) Filed: Dec. 21, 2009

(65) Prior Publication Data

US 2011/0151791 A1    Jun. 23, 2011

(51) Int. Cl.
*B60R 25/10*    (2006.01)

(52) U.S. Cl. ............. 340/426.1; 340/426.2; 340/426.19; 455/456.1

(58) Field of Classification Search ............... 455/456.1, 455/404.1, 569.2, 575.9, 99, 152.1, 557; 340/438, 425.5, 426.1, 426.2, 426.18, 426.19, 340/426.21, 991, 993, 572.4; 348/148; 701/1, 701/213, 36, 200; 342/357.21, 457
See application file for complete search history.

(56) References Cited

U.S. PATENT DOCUMENTS

| 5,895,436 | A | 4/1999 | Savoie et al. |
|---|---|---|---|
| 6,330,438 | B1 | 12/2001 | McClelland et al. |
| 6,803,861 | B2 | 10/2004 | Flick |
| 7,979,095 | B2 * | 7/2011 | Birmingham ............... 455/569.2 |
| 2002/0014978 | A1 | 2/2002 | Flick |
| 2002/0163906 | A1 | 11/2002 | Diachina et al. |
| 2003/0222813 | A1 | 12/2003 | Boulay et al. |
| 2004/0005858 | A1 | 1/2004 | Cervinka et al. |
| 2004/0075539 | A1 | 4/2004 | Savoie et al. |
| 2005/0090952 | A1 | 4/2005 | Boulay et al. |
| 2006/0007039 | A1 | 1/2006 | Duvall |
| 2006/0267744 | A1 | 11/2006 | Baumgartner et al. |
| 2007/0049323 | A1 | 3/2007 | Wang et al. |
| 2007/0079376 | A1 | 4/2007 | Robert et al. |
| 2007/0200688 | A1 | 8/2007 | Tang et al. |
| 2008/0177436 | A1 * | 7/2008 | Fortson ......................... 701/29 |
| 2008/0186932 | A1 | 8/2008 | Do et al. |

FOREIGN PATENT DOCUMENTS

| DE | 10009488 A1 | 11/2000 |
|---|---|---|
| DE | 102004048668 A1 | 4/2006 |
| EP | 0167442 A2 | 1/1986 |
| EP | 1362753 A1 | 11/2003 |
| EP | 1514444 A1 | 3/2005 |
| EP | 1593564 A1 | 11/2005 |

(Continued)

OTHER PUBLICATIONS

International Search Report dated Mar. 1, 2011, from corresponding International Patent Application No. PCT/US2010/060527.

(Continued)

*Primary Examiner* — Dominic E Rego (57) ABSTRACT

Communications are maintained between a base station and a stolen vehicle tracking (SVT) module disposed with a vehicle. At the SVT module at the vehicle, it is determined whether jamming is occurring with communications between the SVT module and the base station and a temperature is measured at the SVT module. When jamming is detected, an adjustment is determined for a frequency of an oscillator of the SVT module and the adjustment is based at least in part upon the temperature. The frequency of operation of an oscillator is adjusted according to the adjustment. A message is transmitted to the base station according to the adjusted frequency.

20 Claims, 4 Drawing Sheets

FOREIGN PATENT DOCUMENTS

| | | | |
|---|---|---|---|
| EP | 1809057 | A1 | 7/2007 |
| EP | 2003818 | A1 | 12/2008 |
| EP | 2124428 | A1 | 11/2009 |
| GB | 2296843 | A | 7/1996 |
| GB | 2317418 | A | 3/1998 |
| GB | 2407455 | A | 4/2005 |
| GB | 2435987 | A | 9/2007 |
| GB | 2445046 | A | 6/2008 |
| GB | 2457102 | A | 8/2009 |
| WO | 95/33214 | A1 | 12/1995 |
| WO | 96/04155 | A1 | 2/1996 |
| WO | 00/21053 | A1 | 4/2000 |
| WO | 01/32481 | A1 | 5/2001 |
| WO | WO01/31797 | A1 | 5/2001 |
| WO | 03/103322 | A1 | 12/2003 |
| WO | 2005/112321 | A1 | 11/2005 |
| WO | 2006/092737 | A2 | 9/2006 |
| WO | 2007/019814 | A1 | 2/2007 |
| WO | 2008/111001 | A2 | 9/2008 |

OTHER PUBLICATIONS

International Search Report dated Jun. 1, 2011, from corresponding International Patent Application No. PCT/US2010/060723.
International Search Report dated Feb. 28, 2011, from corresponding International Patent Application No. PCT/US2010/060532.
International Search Report dated May 24, 2011, from corresponding International Patent Application No. PCT/US2010/060518.
International Search Report dated Apr. 15, 2011, from corresponding International Patent Application No. PCT/US2010/060773.
M. Mouly; M-B Pautet, "Mobility and Security Management" GSM System for Mobile Communications, Jan. 1, 1993, pp. 432-498, Europe Media, Lassay-Les-Chateaux, France.
International Search Report dated Apr. 12, 2011, from corresponding International Patent Application No. PCT/US2010/060760.
International Search Report dated May 13, 2011, from corresponding International Patent Application No. PCT/US2010/060675.
International Search Report dated Mar. 28, 2011, from corresponding International Patent Application No. PCT/US2010/060803.
International Search Report dated Mar. 1, 2011, from corresponding International Patent Application No. PCT/US2010/060750.
International Search Report dated Mar. 10, 2011, from corresponding International Patent Application No. PCT/US2010/060811.
International Search Report dated Jun. 17, 2011, from corresponding International Patent Application No. PCT/US2010/060787.
International Search Report dated Jun. 28, 2011, from corresponding International Patent Application No. PCT/US2010/060795.

* cited by examiner

APPARATUS AND METHOD FOR MAINTAINING COMMUNICATION WITH A STOLEN VEHICLE TRACKING DEVICE

CROSS REFERENCE TO RELATED APPLICATIONS

"Apparatus and Method of Detecting Jamming of Communications" having application Ser. No. 12/643,049

"Apparatus and Method for Broadcasting the Detection of RF Jammer Presence" having application Ser. No. 12/643,825

"Apparatus and Method for Compromised Vehicle Tracking" having application Ser. No. 12/643,498

"Apparatus and Method for Detecting a Cloned Base Station" having application Ser. No. 12/643,081

"Apparatus and Method for detecting Communication Interference" having application Ser. No. 12/643,068

"Apparatus and Method for Detecting a Cloned Base Station" having application Ser. No. 12/643,353

"Apparatus and Method for Determining an Invalid Base Station" having application Ser. No. 12/643,463

"Apparatus and Method for Determining Vehicle Location" having application Ser. No. 12/643,412

"Apparatus and Method for Reducing False Alarms in Stolen Vehicle Tracking" having application Ser. No. 12/643,899

"Apparatus and Method for Tracking Stolen Vehicles" having application Ser. No. 12/643,862

"Apparatus and Method for Maintaining Communications with a Vehicle in the Presence of Jamming" having application Ser. No. 12/643,850 all of which are being filed on the same date as the present application and all of which having their contents incorporated herein by reference in their entireties.

FIELD OF THE INVENTION

The field of the invention relates to communications between various entities and, more specifically to maintaining these communications.

BACKGROUND

Vehicles are equipped with various types of communication systems that provide or facilitate various types of functions. For instance, a vehicle may be equipped with a global positioning satellite (GPS) system that provides for locating the vehicle and providing information concerning the location of the vehicle to a user. Vehicle security systems are also employed in many vehicles to protect the vehicle and its contents from theft or other criminal activity. For example, a vehicular security system may be configured to communicate with some outside entity (e.g., a police or security center) and when an attempt is made to break into a vehicle, the vehicular security system may transmit messages to the outside entity where appropriate action may be taken to prevent or stop the break in. Some jurisdictions even require the use of security systems in vehicles because of the high number of vehicle break-ins or thefts in these areas.

If a vehicle is stolen, stolen vehicle tracking (SVT) applications attempt to track and sometimes recover the stolen vehicle. To give one example, some SVT applications rely upon a GPS system to pinpoint the location of the vehicle and a Global System for Mobile communications (GSM) cellular network to report the incident to a service provider via Short Message Service (SMS) or General Packet Radio Service (GPRS) data connections.

Potential thieves have sometimes attempted to jam the receiver hardware located at the vehicle by employing devices that create a strong wide-band signal in the receive band and thereby block the GPS satellite from being received at the vehicle and/or to block GSM network signals that are sent from the cellular base station to the vehicle.

During normal operation, a transceiver (e.g., a GSM transceiver) receives frequency correction information from the base station and makes necessary adjustments to its time base to compensate for any frequency error between the transceiver and the network. However, if the transceiver is jammed, the transceiver's transmit frequencies will drift, the compensation will not be performed at the transceiver, and the transceiver will broadcast at new, drifted-to frequencies that are not monitored by the base station. Consequently, any warning messages sent by the transponder at the vehicle indicating that the vehicle is stolen will not reach the base station (since they will be broadcast on frequencies not monitored by the base station) and appropriate action will not be taken.

Skilled artisans will appreciate that elements in the figures are illustrated for simplicity and clarity and have not necessarily been drawn to scale. For example, the dimensions and/or relative positioning of some of the elements in the figures may be exaggerated relative to other elements to help to improve understanding of various embodiments of the present invention. Also, common but well-understood elements that are useful or necessary in a commercially feasible embodiment are often not depicted in order to facilitate a less obstructed view of these various embodiments of the present invention. It will further be appreciated that certain actions and/or steps may be described or depicted in a particular order of occurrence while those skilled in the art will understand that such specificity with respect to sequence is not actually required. It will also be understood that the terms and expressions used herein have the ordinary meaning as is accorded to such terms and expressions with respect to their corresponding respective areas of inquiry and study except where specific meanings have otherwise been set forth herein.

DETAILED DESCRIPTION

Approaches are provided where after jamming is detected between a mobile unit in a vehicle and a base station, adjustments to the time base of a mobile unit are automatically made so that the mobile unit can transmit warning messages to a base station. The approaches described herein are easy to use, accurate in determining the occurrence of a jamming or attempted jamming, effective in maintaining communications between the base station and the mobile unit, and cost effective to implement resulting in enhanced security for vehicles and their contents.

In many of these embodiments, communications are maintained between a base station and a stolen vehicle tracking (SVT) module disposed with a vehicle. At the stolen vehicle tracking (SVT) module at the vehicle, it is determined whether jamming is occurring as between communications between the SVT module and the base station. A temperature is measured at the SVT module. When jamming is detected, an adjustment is determined for a frequency of an oscillator of the SVT module and the adjustment is based at least in part upon the temperature. The frequency of operation of an oscillator is changed according to the adjustment. A message is transmitted to the base station according to the adjusted frequency of the oscillator so as to match or approximately match frequencies monitored by the base station.

The adjustment can be made a number of different ways. For example, the adjustment can be made by consulting a data structure. The data structure itself can be structured according to a variety of different forms such as a lookup table. The lookup table may include at least one value and this value can be learned and recorded in the table. Additionally, the data structure may be consulted and an interpolation made between adjacent values in the data structure when the exact value is not obtainable from or stored in the data structure. In an alternative approach, one or more equations may be used to obtain the temperature adjustment where the adjustment is determined by entering various values into the equation.

In other aspects, the SVT module includes a housing and the temperature is measured within the housing. The housing includes all the mechanical and electrical components of the module that perform the designated SVT applications and functions.

In others of these embodiments, when jamming is detected, the operation of the oscillator is adjusted to operate according to at least one predetermined frequency. For example, the at least one predetermined frequency may include two or more frequencies that are separated by a predetermined value. The transmissions are made at these two or more frequencies.

In some examples, a multi-step approach may be used to adjust the frequency of the oscillator. For example, a generalized adjustment may be first obtained by using the above-mentioned equation or consulting a lookup table. Then, the initial adjustment may be refined using predetermined frequency adjustments.

In others of these examples, communications are maintained between a base station and a stolen vehicle tracking (SVT) module disposed at a vehicle. At the stolen vehicle tracking (SVT) module at the vehicle, it is determined whether jamming is occurring as between communications between the SVT module and the base station. When jamming is detected, the frequency of operation of an oscillator of the SVT module is adjusted to operate according to at least one predetermined frequency.

In one approach, the at least one frequency comprises two or more frequencies separated by a predetermined distance. In other approaches, the at least one frequency is offset from a default frequency. Other examples of frequency values are possible.

In still others of these embodiments, a stolen vehicle tracking (SVT) module disposed with a vehicle includes an interface, an oscillator, a temperature sensor, a memory, and a controller. The interface has an input and output and the oscillator is configured to transmit at a selectable frequency. The memory stores temperature control information. The controller is coupled to the interface, the memory, the oscillator, and the temperature sensor, and is configured to determine whether jamming is occurring as between communications between the SVT module and the base station based upon signals received at the input of the interface. The controller is further configured to, when jamming is determined, obtain a frequency adjustment from the temperature control information in memory based at least in part upon the measured temperature. The controller is further configured to adjust the frequency of operation of the oscillator according to the frequency adjustment and conduct communications at the output of the interface according to the adjusted frequency of the oscillator.

Figure 1:
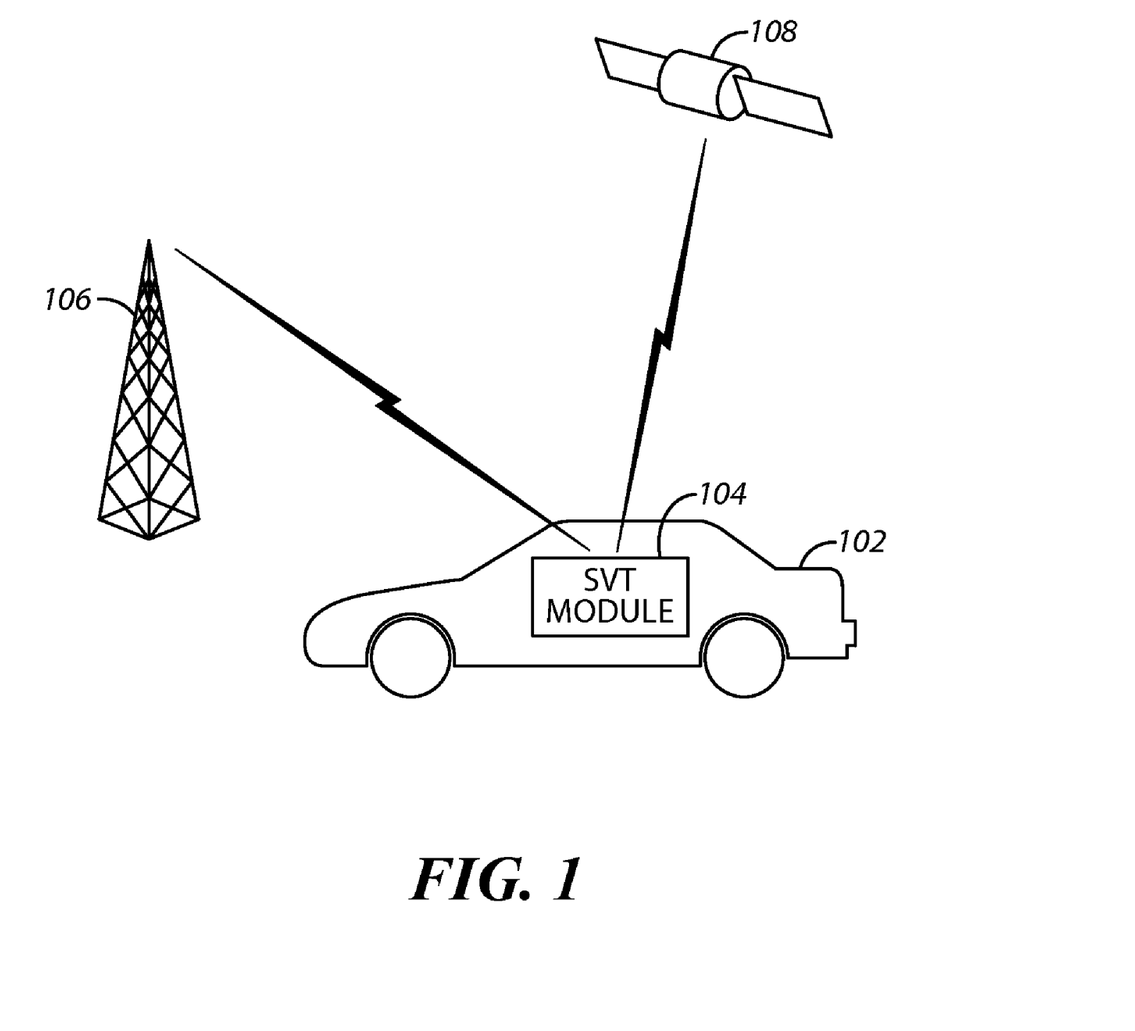
FIG. 1 comprises a block diagram of a system for maintaining communications between a stolen vehicle tracking (SVT) apparatus and a base station according to various embodiments of the present invention.

Referring now to FIG. 1, one example of a system for maintaining vehicular communications is described. A vehicle 102 includes a stolen vehicle tracking module (SVT) 104. The stolen vehicle tracking module 104 is disposed anywhere in or at the vehicle and communicates with a base station 106 and an external navigation system 108. The base station 106 may be any type of base station used within a network such as a cellular telephone network.

The stolen vehicle tracking module 104 may be, in one example, a programmed electronic device that determines the location of the vehicle 102 from signals received from the navigation system 108. The stolen vehicle tracking module 104 also determines if jamming and/or attempted jamming is occurring as to signals being received and/or being transmitted from the navigation system 108 and/or the base station 106 (or some other network element). Further, the stolen vehicle tracking module 104 automatically determines adjustments to its time base once jamming has been detected. As used herein, the term "time base" refers to the frequency of operation of an oscillator (or other device or devices) used to make transmissions from the stolen vehicle tracking module 104. Alternatively, separate device(s) in separate housings may be used to perform the various functions mentioned instead of the single stolen vehicle tracking module 104. The external navigation system 108 may be a GPS satellite or satellite system, in one example.

Many of the approaches described herein are described as being executed by devices that are at least partially disposed at or within a vehicle. However, it will be appreciated that the approaches described herein are not limited to devices that can be disposed at or within vehicles, but can be used with devices that are disposed at any location such as within homes, businesses, or even with individuals that are not within or associated with a vehicle.

The vehicle 102 may be any type of vehicle such as a car, truck, bus, airplane, ship, to name a few examples. The stolen vehicle tracking module 104 is any type of communication device that communicates with entities outside the vehicle 102 using any type of communication technology or protocol. For example, the stolen vehicle tracking module 104 may be or may incorporate a cellular phone, transponder, radio, or some combination of these or other devices. Any of the components of the module 104 may be components that are shared with these devices. For example, the oscillator used may be a cellular phone oscillator as used by the cellular phone (when the module 104 is a cellular phone) as well as used for SVT purposes. In other words, the module may be a separate module, share components with another device (e.g., cellular phone), or be incorporated entirely within or at another device (e.g., cellular phone).

As mentioned, the time base of the stolen vehicle tracking module 104 (or other vehicle hardware) may drift off frequency from the cellular base station due to temperature fluctuations. If the stolen vehicle tracking module 104 is to send out a signal on the Random Access Channel (RACH) to the last known serving cell (BCH), the base station 106 may not see the signal due to the difference in the frequencies of their respective time bases.

A temperature reading is made within the stolen vehicle tracking module 104 (or other vehicle hardware). In some examples, a lookup table in a memory at the stolen vehicle tracking module 104 is used to adjust the oscillator at the communication and stolen vehicle tracking module 104 to accurately align the vehicle's hardware time base with the time base of the cellular base station. The measured temperature may used as an index to access information in the table. The lookup table can contain the frequency movement of the crystal oscillator over temperature. Based upon the internal temperature reading in the stolen vehicle tracking module 104, a microprocessor (or similar device) at the stolen vehicle tracking module 104 can adjust the frequency of the internal time base in order to more accurately align the SVT module time base with the time base of the base station 106. This approach significantly improves the chance that the base station 106 may see the information on the RACH (or other communication channel).

Figure 2:
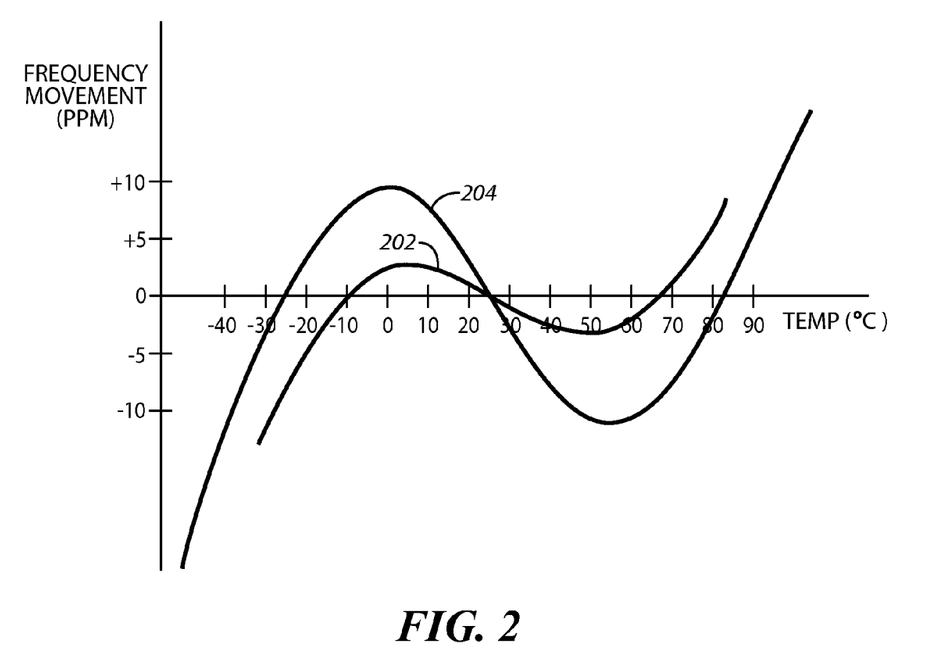
FIG. 2 shows one example of a curve (showing frequency movement of an oscillator versus temperature) that is utilized via the approaches described herein according to various embodiments of the present invention.

In another example, the microprocessor within the stolen vehicle tracking module 104 can execute an algorithm to adjust the oscillator frequency. The crystal resonant frequency varies with temperature for example based upon the cut of the crystal. A typical AT cut curve is shown in FIG. 2 and shows curves 202 and 204. Each of the curves 202 and 204 is for a different cut of a crystal. For each of the curves 202 and 204, frequency movement is shown on the vertical axis and temperature is shown on the horizontal axis. In one example for the curve 204, a temperature of 0 degrees Celsius corresponds to 10 parts per million (ppm) frequency movement.

The curve 202 in FIG. 2 can be approximated by a third order polynomial. For GSM radios, a fifth order polynomial can be used:

$$\text{Delta} f/f_0 = a_0(T-T_0) + a_1(T-T_0)^2 + a_2(T-T_0)^3 + a_3(T-T_0)^4 + a_4(T-T_0)^5$$

Where T is the measured temperature, $T_0$ is the temperature of the inflection point, $f_0$ is the frequency of the inflection point and $a_0$-$a_4$ are the coefficients of frequency. The coefficients can be determined experimentally as is known in the art.

In determining the frequency adjustment to be applied to the oscillator of the stolen vehicle tracking module 104, the above equation can be used. Alternatively, a lookup table can be used with temperature being in one column and the frequency adjustment in the other column. The temperature may then be used as an index to obtain the frequency adjustment. For values not in the table, interpolation approaches can be used to obtain the needed values.

For any of these approaches, the crystal characterization (e.g., frequency movement versus temperature) can be made before the transceiver is built and the corresponding table values or polynomials can be programmed into the unit. The programming can occur at the factory when the unit is constructed. Alternatively, the unit may be programmed on the fly or during some installation process.

In another approach, the unit may implement an algorithm that can adjust the time base by a known frequency step size (rather than via the equation or lookup table mentioned above) in order to potentially align the stolen vehicle tracking module time base with that of the base station. For example, the unit may transmit the information at the default time base frequency and then adjust the time base by a specific step size such as 0.5 ppm (where ppm is parts per million and the parts may ultimately represent a frequency). The unit can repeatedly transmit the message on the RACH while adjusting the time base by multiples of this step size. The SVT module 104 can transmit at 0, +0.5 ppm, -0.5 ppm, 1.0 ppm, -1.0 ppm, +1.5 ppm, -1.5 ppm and so forth. The unit can continue to adjust the time base and transmit information on the RACH burst until the unit receives a flag that its message has been heard or after a set timeout has been reached. For these approaches, the action need only be undertaken when the unit is unable to obtain the frequency correction information from the base station.

In some examples, a multi-step approach may be used to adjust the frequency of the oscillator. For example, a generalized adjustment may be first obtained by using the above mentioned equation or lookup table. Then, the adjustment may be refined using predetermined frequency adjustments. To take one example, a frequency adjustment of 1.0 ppm may be obtained from a lookup table, then this refined by the predetermined value of 0.1 ppm for a total adjustment of 1.1 ppm. It will also be appreciated that these steps may be reversed, i.e., a general approximation of the adjustment may be obtained by using a predetermined value and a lookup table or equation may be used to obtain a refinement for the initial general approximation. Additionally, either approach may be used to obtain both the general and refined approximation for adjustment.

In one example of the operation of the system of FIG. 1, at the stolen vehicle tracking module 104 at the vehicle 102, it is determined whether jamming is occurring with communications between the stolen vehicle tracking module 104 and the base station 106 and a temperature is measured at the stolen vehicle tracking module 104. When jamming is detected, an adjustment is determined for a frequency of an oscillator of the stolen vehicle tracking module 104 and the adjustment is based at least in part upon the measured temperature. The frequency of operation of an oscillator is changed according to the adjustment. A message is transmitted to the base station 106 according to the adjusted frequency.

As already mentioned, the adjustment can be made according to a number of different ways. For example the adjustment can be made by consulting a data structure stored in a memory at the stolen vehicle tracking module 104. The data structure can be a variety of different forms such as a lookup table. The lookup table may include at least one value and this value can be learned and recorded in the table. Additionally, the data structure may be consulted and an interpolation made between adjacent values in the data structure. In an alternative approach, an equation may be used and the adjustment determined by using an equation.

In other aspects, the stolen vehicle tracking module includes a housing and the temperature is measured within the housing. The housing may be constructed of any suitable materials and a temperature sensor may be disposed within the housing to determine temperature.

In another example of the operation of the system of FIG. 1, when jamming is detected by the stolen vehicle tracking module 104, the operation of the oscillator at the stolen vehicle tracking module 104 is adjusted to operate according to at least one predetermined frequency. For example, the at least one predetermined frequency includes two or more frequencies that are separated by a predetermined value. As mentioned, a multi-step approach may be used to adjust the frequency of the oscillator. For example, a generalized adjustment may be first obtained by using the above mentioned equation or lookup table. Then, the adjustment may be refined using predetermined frequency adjustments.

In still another example of the operation of the system of FIG. 1, at the stolen vehicle tracking module 104 at the vehicle, it is determined whether jamming is occurring as between communications between the stolen vehicle tracking module 104 and the base station 106. When jamming is detected, the frequency of operation of an oscillator of the stolen vehicle tracking module 104 is adjusted to operate according to at least one predetermined frequency.

Figure 3:
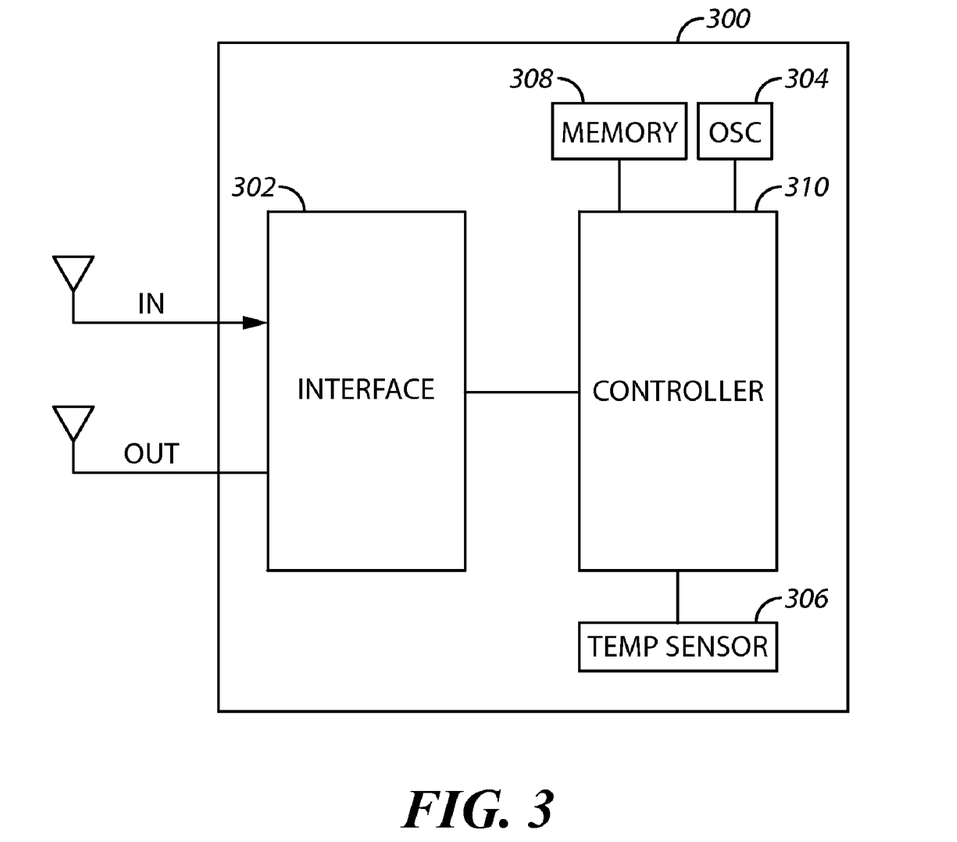
FIG. 3 comprises a block diagram of a stolen vehicle tracking (SVT) apparatus that mains communications with a base station according to various embodiments of the present invention.

Referring now to FIG. 3, a stolen vehicle tracking (SVT) module 300 disposed with a vehicle includes an interface 302, an oscillator 304, a temperature sensor 306, a memory 308, and a controller 310. The interface 302 has an input and output and the oscillator 304 is configured to transmit at a selectable frequency. In one example, the oscillator 304 may be an oscillator as used in a cellular phone.

The memory 308 stores temperature control information. The temperature control information may be stored as an equation, or in a data structure (e.g., a lookup table). The memory 308 may be any suitable memory storage device such as a random access memory (RAM), read only memory (ROM), to name two examples. The temperature control information may be learned over time, for example, using temperature sensors to determine temperature variations and other sensors to determine frequency movement over a measured temperature range. In one example, when the cellular transceiver's oscillator is aligned with the base station, the temperature can be recorded in a table along with the corresponding value of the control signal that was used to adjust the oscillator.

The controller 310 is coupled to the interface 302, the memory 308, the oscillator 304, and the temperature sensor 306, and is configured to determine whether jamming is occurring as between communications between the SVT module and the base station based upon signals received at the input of the interface. Jamming can be determined in a variety of different ways. In some examples, as described in co-pending application entitled "Apparatus and Method for Detecting Jamming of Communications" filed on the same date as the present application and having application Ser. No. 12/643,049, a signal strength indicator is a numeric value that generally indicates the strength of a received signal in cellular communication systems. More specifically, the signal strength indicator is a value that indicates the magnitude of the signals that are transmitted and received within these systems.

A first rate of rise of a signal strength indicator associated with the first communication channel and a second rate of rise of a signal quality indicator associated with the first communication channel are monitored. The signal strength indicator may be a received signal strength indicator (e.g., Rx Level) and the signal quality indicators may be the RX quality level (e.g., Rx Qual). When at least one of the first rate rises at a rate greater than a first predetermined threshold rate and the second rate rises at a rate greater than a second predetermined threshold rate, jamming can be determined to exist.

The controller 310 is further configured to when jamming is determined and obtain a frequency adjustment from the temperature control information in memory based at least in part upon the measured temperature. The controller 310 is further configured to adjust a frequency of operation of the oscillator 304 according to the frequency adjustment and conduct communications at the output of the interface 302 according to the adjusted frequency of the oscillator 304.

Figure 4:
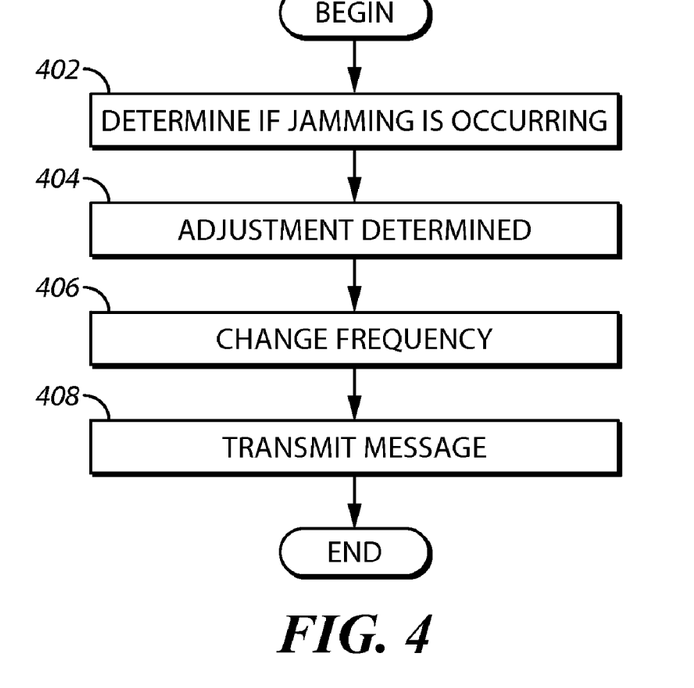
FIG. 4 comprises a flowchart of one example of an approach for maintaining communications between a stolen vehicle tracking (SVT) apparatus and a base station according to various embodiments of the present invention.

Referring now to FIG. 4, one example of an approach for maintaining communication with a stolen vehicle tracking (SVT) module in a vehicle is described. At step 402 and at the stolen vehicle tracking module at the vehicle, it is determined whether jamming is occurring with communications between the SVT module and the base station and a temperature is measured at the SVT module. The occurrence of jamming can be determined in a variety of different ways, for instance, by comparing signal strength measurements to predetermined thresholds as mentioned above.

At step 404 when jamming is detected, an adjustment is determined for a frequency of an oscillator of the SVT module and the adjustment is based at least in part upon the temperature. As mentioned, the adjustment may be made via consulting a data structure (e.g., a lookup table) or using an equation to calculate the adjustment to name two approaches.

At step 406, the frequency of operation of an oscillator is changed according to the adjustment. For example, as is known in the art, the configuration of electrical components coupled to the oscillator may be changed to alter the frequency as is known in the art.

At step 408, a message is transmitted to the base station according to the adjusted frequency. Since the frequency now takes into account temperature fluctuations, a significant higher chance exists that these messages will be effectively received by the base station (since it is listening on the same or approximately the same frequency as the SVT module is transmitting). Once the message is received, appropriate action may be taken by the appropriate authorities to track and/or recover the vehicle.

Figure 5:
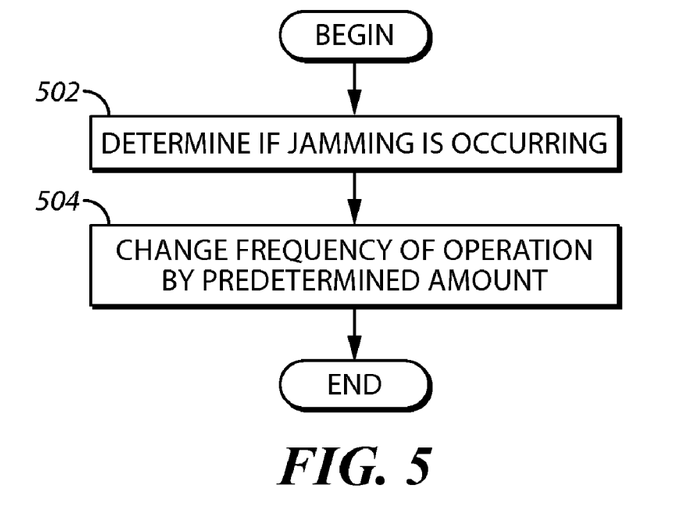
FIG. 5 comprises a flowchart of another approach for maintaining communications between a stolen vehicle tracking (SVT) apparatus and a base station according to various embodiments of the present invention.

Referring now to FIG. 5, another example of an approach for maintaining communications with a stolen vehicle tracking (SVT) module at the vehicle is described. At step 502, it is determined whether jamming is occurring as between communications between the SVT module and the base station. The occurrence of jamming can be determined in a variety of different ways, for instance, by comparing signal strength measurements to predetermined thresholds as mentioned above.

At step 504, when jamming is detected, the frequency of operation of an oscillator of the SVT module is adjusted to operate according to at least one predetermined frequency. For example and as mentioned, the unit may transmit the information at the default time base frequency and then adjust the time base by a specific step size such as 0.5 ppm (where ppm is parts per million and the parts may ultimately represent a frequency). The unit can repeatedly transmit the message on the RACH while adjusting the time base by multiples of this step size. The SVT module can transmit at 0, +0.5 ppm, −0.5 ppm, 1.0 ppm, −1.0 ppm, +1.5 ppm, −1.5 ppm and so forth. The unit can continue to adjust the time base and transmit information on the RACH burst until the unit receives a flag that its message has been heard or after a set timeout has been reached. Once the message is received, appropriate action may be taken by the appropriate authorities to track and/or recover the vehicle.

It will be appreciated that the above step sizes are examples only and can be adjusted according to the needs of the system. In addition, these step sizes can also vary as between each other rather than be fixed as described above. Further, the step sizes can be determined according to historical data and measurements and are typically programmed into the stolen vehicle tracking unit during the manufacturing process. Also, the step sizes/increments can vary based upon a variety of different factors. For instance, one set may be used when the stolen vehicle tracking module is in an urban environment while another set is used when the module is in a rural environment.

Thus, approaches are provided where the jamming or attempted jamming of communications (e.g., vehicular communications) can be detected easily and any instances of the jamming and/or attempted jamming communicated to an emergency reporting system or center and/or other authorized person or persons so that appropriate action can be taken to protect the vehicle or the contents of the vehicle and prevent the occurrence of a crime. The approaches described herein are easy to use, accurate in determining the occurrence of a jamming or attempted jamming, effective in maintaining communications as between the mobile unit and the base station, and cost effective to implement resulting in enhanced security for vehicles and their contents. These approaches are also flexible in their use. For instance, a generalized adjustment may be first obtained and this initial value may be fine-tuned to obtain a more targeted adjustment.

Those skilled in the art will recognize that a wide variety of modifications, alterations, and combinations can be made with respect to the above described embodiments without departing from the spirit and scope of the invention, and that such modifications, alterations, and combinations are to be viewed as being within the scope of the invention.

What is claimed is:

1. A method of maintaining communications between a base station and a stolen vehicle tracking (SVT) module disposed with a vehicle, the method comprising:
   at the stolen vehicle tracking (SVT) module at the vehicle:
   determining whether jamming is occurring with communications between the SVT module and the base station,
   measuring a temperature at the SVT module;
   when jamming is detected, determining an adjustment for a frequency of an oscillator of the SVT module, the adjustment based at least in part upon the temperature;
   adjusting the frequency of operation of an oscillator according to the adjustment;
   transmitting a message to the base station according to the adjusted frequency.

2. The method of claim 1 wherein determining the adjustment comprises consulting a data structure.

3. The method of claim 2 wherein the data structure comprises a lookup table.

4. The method of claim 2 wherein the lookup table comprises at least one value and further comprising learning the at least one value.

5. The method of claim 2 wherein consulting the data structure comprises interpolating between adjacent values in the data structure.

6. The method of claim 1 wherein determining the adjustment comprises determining the adjustment using an equation.

7. The method of claim 1 wherein the SVT module comprises a housing and wherein measuring the temperature comprises measuring the temperature within the housing.

8. The method of claim 1 further comprising when jamming is detected, adjusting the oscillator to operate according to at least one predetermined frequency.

9. The method of claim 8 wherein the at least one predetermined frequency comprises two or more frequencies that are separated by a predetermined value.

10. A non-transitory computer usable medium having a computer readable program code embodied therein, said computer readable program code adapted to be executed to implement a method of maintaining communications between a base station and a stolen vehicle tracking (SVT) module disposed with a vehicle, the method comprising: at the stolen vehicle tracking (SVT) module at the vehicle: determining whether jamming is occurring with communications between the SVT module and the base station, measuring a temperature at the SVT module; when jamming is detected, determining an adjustment for a frequency of an oscillator of the SVT module, the adjustment based at least in part upon the temperature; adjusting the frequency of operation of an oscillator according to the adjustment; transmitting a message to the base station according to the adjusted frequency.

11. A non-transitory computer usable medium of claim 10 wherein determining the adjustment comprises consulting a data structure.

12. A non-transitory computer usable medium of claim 11 wherein the data structure comprises a lookup table.

13. A stolen vehicle tracking (SVT) module disposed at a vehicle, comprising:
   an interface having an input and output;
   an oscillator configured to transmit at a selectable frequency;
   a temperature sensor;
   a memory storing temperature control information;
   a controller coupled to the interface, the memory, the oscillator, and the temperature sensor, the controller configured to determine whether jamming of communications between the SVT module and the base station is occurring based upon signals received at the input of the interface, the controller being further configured to, when jamming is determined, obtain a frequency adjustment from the temperature control information in memory based at least in part upon the measured temperature, the controller further configured to adjust a frequency of operation of the oscillator according to the frequency adjustment and conduct communications at the output of the interface according to the adjusted frequency of the oscillator.

14. The module of claim 13 wherein the temperature control information comprises a data structure.

15. The module of claim 14 wherein the data structure comprises a lookup table.

16. The module of claim 15 wherein the values in the lookup table are learned.

17. The module of claim 15 wherein the controller is configured to interpolate adjacent values in the data structure.

18. The module of claim 14 wherein the temperature control information comprises at least one equation.

19. The module of claim 14 wherein the controller is configured to, when jamming is detected, adjust the frequency of the oscillator to broadcast on at least one predetermined frequency.

20. The module of claim 19 wherein the at least one predetermined frequency comprises two or more frequencies that are separated by a predetermined value.

* * * * *